United States Patent

[11] 3,538,867

| [72] | Inventors | Richard L. Every;<br>Richard M. Tillman, Ponca City, Oklahoma |
|---|---|---|
| [21] | Appl. No. | 705,270 |
| [22] | Filed | Feb. 14, 1968 |
| [45] | Patented | Nov. 10, 1970 |
| [73] | Assignee | Continental Oil Company<br>Ponca City, Oklahoma<br>a corporation of Delaware |

[54] FERTILIZING METHOD
1 Claim, No Drawings

[52] U.S. Cl. .................................................. 111/6, 71/30

[51] Int. Cl. .................................................. C05g 1/00, C05c 3/00, C05c 9/00, A01c 23/02, A01c 21/00

[50] Field of Search .......................................... 111/1, 6, 7; 47/58; 71/54, 30

[56] References Cited
UNITED STATES PATENTS

| 2,781,612 | 2/1957 | Dugan | 47/58 |
| 2,843,067 | 7/1958 | Dugan | 111/7 |
| 2,988,025 | 6/1961 | Johnston | 111/6 |
| 3,070,434 | 12/1962 | Turner et al. | 111/7X |
| 3,148,642 | 9/1964 | Gould | 111/7 |

Primary Examiner—Robert E. Bagwill
Attorneys—Joseph C. Kotarski, Henry H. Huth, Jerry B. Peterson, William A. Mikesell, Jr. and Carroll Palmer ABSTRACT: Penetrability of ammonia into soil by high pressure injection is improved by dissolving therein a soluble salt.

FERTILIZING METHOD

DISCLOSURE OF INVENTION

This invention relates to a method of applying liquid fertilizer to the soil.

Techniques of applying fertilizer to the soil have long been studied with the objectives of obtaining more uniform distribution at lower cost and in a simpler manner. Various advantages for a liquid, as opposed to a solid, are well known for many applications, and it is also recognized that anhydrous ammonia, under sufficient pressure or at low enough temperature to maintain a liquid phase, is the most concentrated source of available nitrogen known. However, its use as a fertilizer is limited because it must be handled at relatively high pressure at ambient temperature and also, because of its vapor pressure, it is difficult to apply to the soil in a manner that it will be retained. One way it has been applied is by using a knife blade to cut a deep slit in the soil, metering the ammonia down into the slit, and then pressing the slit shut by suitable wheels or shoes. Another more recent technique involves injecting the ammonia, either continuously or in discrete slugs, under high pressure into the ground. In the slit-trench technique, retention of the ammonia by the soil is not usually entirely satisfactory, and in the pressure injection technique, the amount of power required to effect a desired degree of penetration can be excessive.

According to this invention, we have discovered that anhydrous ammonia can be greatly improved for agronomic purposes by dissolving therein a salt. It is known that dissolving a salt in ammonia will reduce the vapor pressure of the system, and it might be deduced from this that such a solution would be retained longer by the soil. We have now discovered, however, that such a solution exhibits surprisingly improved penetration into the soil, which is of course quite advantageous when applying it by the high pressure injection method.

The high pressure or jet injection method of applying ammonia comprises forcing ammonia through a nozzle under high pressure, the nozzle being directed at the soil. Pressures used have varied from about 400 to about 6000 p.s.i. The objective is to impart a high velocity to the ammonia such that its momentum will cause it to penetrate into the soil to a sufficient depth to be retained. This has been effected by ejecting the ammonia in a continuous stream from the nozzle, as shown for example by U.S. Pat. Re 25307, reissued Dec. 25, 1962 and formerly U.S. Pat. No. 2,988,025, or by ejecting the ammonia in discrete slugs, as shown for example by U.S. Pat. No. 3,012,526, issued Dec. 12, 1961. A major advantage of the jet injection method resides in the fact that very little or no disturbance of the soil surface is required, which permits its use in pasture land and on small grain crops, such as wheat, after emergence.

The ammonia solution contemplated by this invention is derived by dissolving a salt in anhydrous ammonia. The 'anhydrous' ammonia of commerce typically contains a few tenths of a weight percent of water, and this material is quite satisfactory for the present invention, although of course truly anhydrous ammonia will serve.

The salt to be added should meet two, and preferably three, criteria. First, it should have good solubility in ammonia. Second, it should increase the density and boiling point of the resulting solution. Third, it should preferably be a material which has plant nutrient value, but in no event should it harm the plant. For example, chloride ion is detrimental to most crops, so sodium chloride is normally not a suitable salt for the purposes of this invention. With these three criteria in mind, many suitable compounds or salts can be selected. Among those preferred for practice of this invention are urea, potassium amide, thiourea, ammonium polysulfide, phosphorus pentasulfide, and sulfamide. All these compounds contain one or more of the four basic plant nutrients, nitrogen, phosphorus, potassium, and sulfur.

The amount of the salt to be dissolved in the ammonia can vary widely, and of course two or more salts can be dissolved in the same solution in order to balance nutrient value. In order to obtain much benefit in soil penetrating ability, a minimum of at least about 5 weight percent salt should be added. The maximum usable amount is limited by the solubility of the salt in ammonia, measured at the lowest temperature which is contemplated. Excess salt in the solid phase should be avoided in order to prevent plugging up of the injection equipment.

The following example is offered by way of illustration. A nozzle with a 0.031 inch orifice was connected to a timer-operated solenoid valve, which in turn was connected to a source of liquid at 500 p.s.i. The valve was opened for a series of 200 microsecond pulses, with the jet being directed into modeling clay. A solution of 18.8 percent urea in anhydrous ammonia penetrated the clay to a depth of about four times that of anhydrous ammonia itself. The urea solution penetrated about 90 percent as far as liquid water, which was used as a standard. It was noted that the solution produced a jet having the same compact appearance as that of water, while anhydrous ammonia alone produced a jet which was thick, bulky and fan-shaped. In other tests, thickening agents were added to the ammonia in order to determine whether liquid viscosity affects soil penetrating ability, and it was surprisingly discovered that this factor has no significant effect. Although we do not wish to be so limited, we theorize that the improvement derived by our invention results partially from the increased momentum available with a more dense liquid, and partially from the lowered vapor pressure, which results in less material vaporizing from the outer surface of the travelling slug of liquid, in turn providing a more compact slug. Our solutions are also advantageous when compared to anhydrous ammonia in that they have a lower vapor pressure and thus are more readily stored and handled, and can be transported by pipe line. Also, if more solution is made up than can be consumed, it can easily be separated into its components again by flashing off the ammonia.

It is to be understood that, while preferred embodiments of the invention have been described in detail, various changes can be made without departing from the spirit and scope of the invention as defined by the appended claims.

We claim:

1. In the injection of anhydrous ammonia into soil under high pressure, the method of obtaining increased penetration of the ammonia into the soil which comprises:
    a. dissolving in said ammonia at least about 5 weight percent urea; and
    b. injecting the resulting urea-ammonia solution into the soil at a pressure of at least about 400 p.s.i. in the form of discrete jets of said solution to effect penetration with minimum soil surface disturbance.